R. E. MANLEY.
PRESS.
APPLICATION FILED OCT. 29, 1921.
1,437,943.
Patented Dec. 5, 1922.
2 SHEETS—SHEET 1.
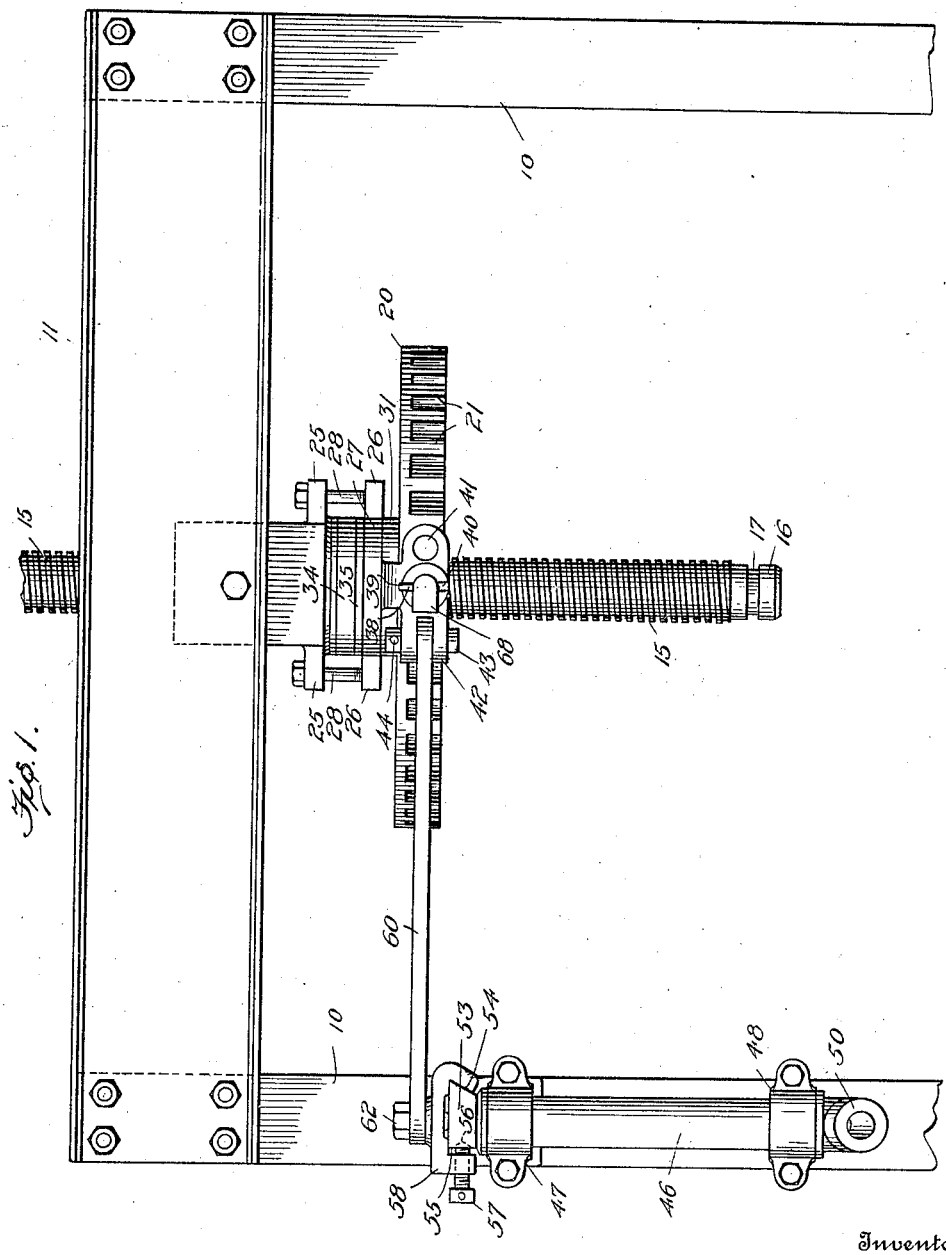

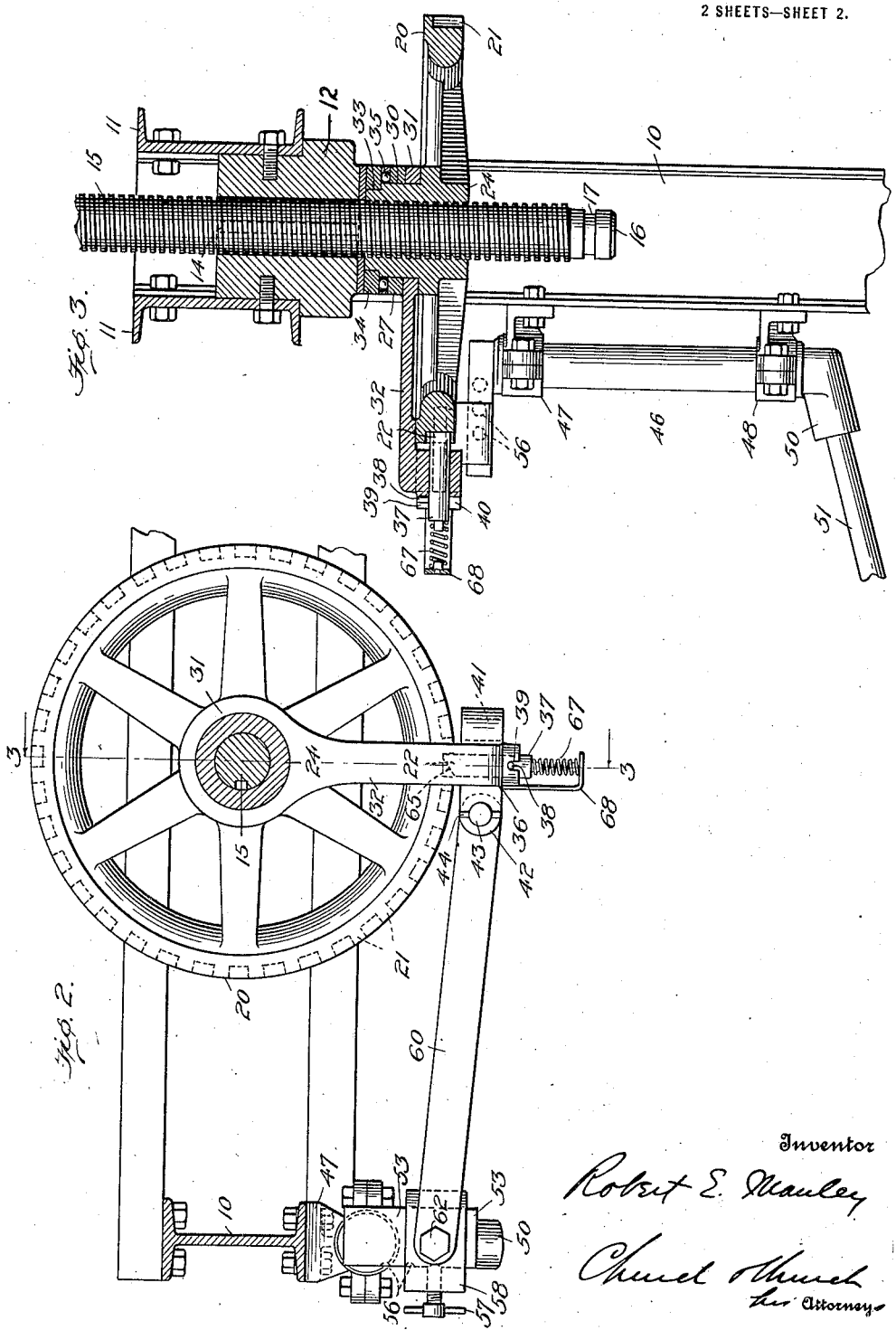

Patented Dec. 5, 1922.

1,437,943

UNITED STATES PATENT OFFICE.

ROBERT E. MANLEY, OF YORK, PENNSYLVANIA.

PRESS.

Application filed October 29, 1921. Serial No. 511,350.

*To all whom it may concern:*

Be it known that I, ROBERT E. MANLEY, a citizen of the United States, residing at York, in the county of York and State of Pennsylvania, have invented certain new and useful Improvements in Presses; and I do hereby declare the following to be a full, clear, and exact description of the same, reference being had to the accompanying drawings, forming part of this specification.

This invention relates to a press intended primarily for use in automobile garages and repair shops, although adapted to various other uses, as will be apparent from the following description.

The principal object of the present invention is to provide a convenient, simple and efficient system of power transmission for operating the screw of the press by means of a hand lever, so positioned as to give great ease of operation.

A further object of the invention lies in the provision of means for adjusting the throw of the various levers so as to operate the main wheel one, two or three teeth at a time, and the invention also contemplates the rendering of the step-by-step movement inoperative in order to advance the screw at a more rapid speed, as, for example, when adjusting the screw with regard to the work.

In the drawings,—

Figure 1 represents a front elevation of the superstructure of a press embodying the present invention.

Fig. 2 is a plan view of the device shown in Fig. 1.

Fig. 3 is a central vertical section on the line 3—3 of Fig. 2 and showing the hand-lever mechanism in side elevation and slightly lowered from true position for convenience of illustration.

The superstructure is preferably composed of rolled sections of commercial size and shape, as for example, the I-beams 10 which are connected at their upper extremities by the channel irons 11, these members forming the upper frame of the press. A bearing block 12 is secured centrally between the two channel members 11, and carries or is integral with a spline 14 received within the vertical slot of the screw 15, so that the screw is restrained from rotation relatively to the frame while having free axial or vertical movement. The screw 15 constitutes the pressure transmitting member of the press and for this reason is provided at its lower end with a reduced section or shank 16 to be received in the socket of any of the various attachments usual on such presses, the set screw of such attachment seating into the peripheral groove 17 of the shank.

The wheel 20 is provided with a series of rectangular teeth 21 to engage a pawl 22 and has its hub portion 24 forming a horizontal nut rotatably mounted on the screw but held against vertical or axial movement with respect to the press frame, in order to raise and lower the screw 15. The bearing block 12 carries a pair of outward extending lugs 25 registering with similar lugs 26 on a ring 27 and bolts 28 suspend and position the ring 27 and block 22 holding the former against movement. The hub-nut 24 has a reduced portion 30 to receive loosely the ring 27 and also the annular extremity 31 of the lever arm 32, the latter oscillating about the axis of the screw. The hub-nut 24 is further reduced in diameter, as at 33, to receive a ring 34, serving as the thrust bearing for the rollers or balls 35 held between the ring 34 and the lower race member or ring 27.

The lever 32 at its free end has a socket member 36 having a central bore in which is mounted a cylindrical pawl 37 carrying a pin 38 which is received in the upper slot 39 or the lower slot 40 of the socket 36, depending upon the direction of rotation desired to be transmitted to the pressure screw. The socket 36, in addition to the bore for the pawl 37, is provided with a recess 40, for the reception of a handle (not shown) for operating the lever 32 when the pawl is withdrawn from contact with the teeth 21. At the opposite side, the socket 36 carries a fork 42 perforated to receive a loosely fitting connecting pin 43 having a dowel 44 in its upper surface to prevent its falling through the registering perforations in the two prongs of the fork.

An oscillating rod 46 is mounted in a pair of bearings 47 and 48, secured to one of the I-beams 10 and carries at its lower end a socket 50 in which is received one end of the hand lever 51, which preferably extends downward at a slight angle so as to provide the most convenient position for operation by a mechanic. Particular attention is called to the fact that with this structure the lever is operated in a plane about the level of the chest of the operator, who is thus able to throw his entire weight against the lever 51 and consequently to exert a greater force through the screw than is possible with the older type frames, where the hand lever is either operated in a vertical plane, or is placed so high that the weight of the operator cannot be thrown against it.

The rod 47 carries at its top a projecting plate 53 having a downwardly projecting rear face 54 at one side and a vertical face 55 at the other side, the latter having a plurality of indentations 56 to receive the rounded end of a set screw 57 threaded through the sliding clamp 58 adjustable on the plate 53. A link 60 is perforated at its ends to receive the pin 43 and the bolt 62 passing through the center of the clamp 58. If desired the bolt 52 may serve the dual function of pivot for the link 60 and as set screw, to take the place of the element 57 by beveling the face 55 of the plate 53, so that the clamp will underhang the plate on both sides as is now the case with the edge 64.

For the smallest leverage the set screw 57 is placed in the indentation 56 nearest the axis of the rod 47, and the hand lever 51 is oscillated, causing a movement of the link 60 to the right, as shown in the figures, thus moving the wheel 20 forward one tooth. On reverse movement of the lever 51 the link is pulled to the left and the beveled face 65 of the pawl rides over the edge of the tooth 21, pushing the pawl away from the tooth and against the pressure of the spring 67 held in position by the bracket 68 carried by the extremity of the lever arm 32.

By placing the set screw 57 in the indentation 56 farthest from the axis of the rod 46, the pawl is caused to move the distance of three teeth, and, on reverse movement, slides past three teeth, the action of the spring at all times being to urge the pawl toward the axis of the screw.

By removing the connector pin 43, the link 60 can be turned about its pivot on the bolt 62 and moves out of the way so that the rod 51 or any similar rod may be placed in the opening 40 and the lever arm 32 be turned through nearly 180°, or, if desired, the wheel 20 may be turned by hand, the lever 32 swinging freely around with it, as the distance from the end of the bracket 68 to the axis of the screw is less than the distance from said axis to either of the flanges of the I-beams 10.

What I claim is:

1. In a press, a frame, a bearing block secured in said frame, a screw mounted for axial movement in said bearing block, means for preventing rotation of said screw, a wheel having a hub threaded on said screw, means for preventing movement of said wheel away from said bearing, a lever loosely mounted on the hub of said wheel, a spring-pressed pawl mounted in said lever, an oscillating plate pivoted to said frame, a clamp slidably and adjustably mounted on said plate, a link connecting said clamp and lever, means for oscillating said plate about its pivot.

2. In a press, a frame, a slotted screw, a bearing block carried by said frame and receiving said screw, a spline for preventing rotation of said screw, a shrouded gear wheel threaded on said screw, a lever loosely mounted on the hub of said wheel and slidably engaging the shrouded portion thereof, a reciprocating pawl carried by the free end of said lever, means for urging said pawl in contact with the teeth of said wheel, a perforated extension on said lever, a manually operable mechanism mounted on said frame, a link attached to said mechanism, and means for detachably securing said link to the free end of said lever.

3. In a press, a frame, a pressure screw mounted in said frame for axial movement, means for preventing rotation of said screw, a nut mounted on said screw, means for preventing movement of said nut axially of said screw, a lever loosely pivoted on said nut, a toothed wheel secured to said nut, an extension on said lever having a plurality of cylindrical bores and a plurality of grooves diametrically disposed with respect to one of said bores, a pawl slidable in one of said bores, a pin carried by said pawl adapted to engage either of said slots at will, means for releasably holding said pin in said slot, and means for oscillating said lever through a small angle, said means being detachable so that said lever may be rotated through a greater angle by means of an implement placed in the other of said bores.

4. In combination, a bearing, a screw loosely mounted in said bearing, means for preventing relative rotation of said screw and bearing, a nut threaded on said screw, a wheel carried by said nut and having shrouded teeth in its periphery, a lever loosely mounted on said hub, a ring secured to said hub, an annular member loosely mounted on said hub between said lever and said ring and forming a raceway with the latter, means for securing said ring in fixed relation with said bearing, and means carried by said lever for engaging said teeth.

5. In combination, a nut, a toothed wheel secured to said nut, a reciprocating member movable through a small angle near the periphery of said wheel, a pawl carried by said reciprocating member and engageable with the teeth of said wheel, and manually operable means for altering the throw of said reciprocating member and consequently varying at will the size of the angle through which said wheel is turned at each reciprocation of said member.

ROBERT E. MANLEY.